Aug. 10, 1965  J. N. SHINN  3,199,782
REVERSIBLE FLUID BINARY COUNTER
Filed Aug. 28, 1963  3 Sheets-Sheet 1

Inventor:
Jeffrey N. Shinn,
by Paul A. Frank
His Attorney.

Fig. 4.

| INPUT | COUNTING DIRECTION | THIRD STAGE (30) LOGIC 1 | 0 | SECOND STAGE (29) LOGIC 1 | 0 | FIRST STAGE (28) LOGIC 1 | 0 | BINARY | PULSE COUNT |
|---|---|---|---|---|---|---|---|---|---|
| 0 |   |   | X |   | X |   | X | 0 0 0 | 0 |
| X | F |   | X |   | X | X |   | 0 0 1 | 1 |
| X |   |   | X | X |   |   | X | 0 1 0 | 2 |
| X |   |   | X | X |   | X |   | 0 1 1 | 3 |
| X |   | X |   |   | X |   | X | 1 0 0 | 4 |
| X |   | X |   |   | X | X |   | 1 0 1 | 5 |
| X | ↓ | X |   | X |   |   | X | 1 1 0 | 6 |
| X | R | X |   |   | X | X |   | 1 0 1 | 5 |
| X |   | X |   |   | X |   | X | 1 0 0 | 4 |
| X | ↓ |   | X | X |   | X |   | 0 1 1 | 3 |
| X | F | X |   |   | X |   | X | 1 0 0 | 4 |

X-REPRESENTS PRESENCE OF FLUID FLOW

Inventor:
Jeffrey N. Shinn,
by Paul G. Frank
His Attorney.

United States Patent Office 3,199,782
Patented Aug. 10, 1965

3,199,782
REVERSIBLE FLUID BINARY COUNTER
Jeffrey N. Shinn, Scotia, N.Y., assignor to General Electric Company, a corporation of New York
Filed Aug. 28, 1963, Ser. No. 305,051
11 Claims. (Cl. 235—201)

My invention relates to fluid control devices, and in particular, to a digital-type fluid amplifier circuit that operates as a reversible binary counter.

A fluid amplifier is a device having no moving parts for containing the passage of a fluid medium therethrough and for controlling such passage by means of additional flows of a fluid medium. Fluid amplifier devices have the potential for wide application in the field of fluid power and control. Thus, they may be employed as digital and analog computing elements and also as power devices to operate valves and the like. Fluid amplifiers feature inherent reliability since they generally employ no moving parts, and they can be produced at low cost due to their ease of fabrication from virtually any material that is nonporous and has structural rigidity. As a result, such devices are ideal for application where nuclear radiation, high temperature, vibration, and shock may be present. Fluid amplifiers may be operated as pneumatic devices employing a compressible fluid, such as gas or air, or as hydraulic devices utilizing an incompressible fluid, such as water or oil.

One of the two basic types of fluid amplifiers is the boundary layer effect type wherein a primary (power) fluid flow is deflected by the interaction of secondary (control) fluid flow and the side walls of an interaction chamber shaped in such a way that the power fluid attaches to one or the other of the side walls but not to both side walls. This alternate attachment is brought about, after initial lateral deflection by the control fluid, by the entrainment action of the power fluid wherein such fluid flow tends to entrain the fluid medium at a lower pressure between it and an adjacent side wall. Entrainment becomes more effective as the power fluid flow approaches more closely to the adjacent side wall, since the pressure of the trapped fluid becomes still lower. The flow becomes stable in the wall-attached position, and if undisturbed, remains so attached. The power fluid can be detached from a first side wall by introducing a control fluid flow between the power fluid and the first side wall, in which case, the power flow shifts or switches to the second side wall. This type of amplifier is basically a two-position device, and for this reason, it is generally referred to as a digital device.

The two side walls of the conventional digital-type fluid amplifier diverge and form the outer sides of two fluid flow passages, generally described as fluid flow receivers, which terminate in suitable fluid flow outlet means. Thus, in the operation of a digital-type fluid amplifier, the power fluid impinges upon a first of the fluid receivers in a first of its two operative states and upon the second receiver in the second state.

Fluid amplifiers of the digital type are a recent innovation and thus their application has been limited to basic circuits. A known application of such fluid amplifiers is a fluid-operated binary counter which is useful in computers and control systems in general. A limitation of such known counter is the fact that it can count (add) in only one (for example, forward) direction. There are many applications, such as guidance controls for water and space navigation, wherein it is highly desirable to utilize a reversible binary counter.

Therefore, one of the principal objects of my invention is to provide an improved digital-type fluid amplifier circuit that operates as a reversible binary counter.

Known fluid-operated binary counters are provided with a reset feature whereby the binary counter may be reset to zero counts after a predetermined number of counts have been registered. This feature, though desirable in some applications, is a serious limitation in many other applications such as in the aforementioned navigation control. Thus, in changing the course heading of a vehicle, it may be desirable to preset the binary counter to a count, indicative of a particular heading, which in general is other than zero.

Therefore, another important object of my invention is to provide an improved fluid-operated reversible binary counter with means for presetting the counter to any desired count.

Known fluid-operated binary counters are also provided with read-out devices which indicate the summation or the attainment of a particular count. However, such known read-out devices comprise fluid amplifier circuitry employing fluid amplifiers of a construction different from those employed in the counter circuit.

Therefore, still another object of my invention is to provide an improved fluid-operated reversible binary counter having read-out means wherein such means employs fluid amplifiers of a construction identical to the amplifiers utilized in the counter circuit.

Briefly stated, my invention provides a fluid-operated reversible binary counter having a selected number of serially-connected binary logic stages. Each stage comprises three interconnected digital-type fluid amplifiers. The first amplifiers convert successive fluid pulses into alternating fluid flows which determine the particular state of binary logic in each respective stage. The alternating fluid flows are provided at the two fluid flow outlets (outputs) of each first amplifier and supply the primary (power) fluid to the second and third amplifiers. The fluid pulses supplied to the first amplifier in the first stage comprise the sequential (input) pulses to be counted by the binary counter. The pulses supplied to the first amplifiers in succeeding stages comprise selected output fluid flows of the second and third amplifiers in the preceding stage whereby the binary logic stages are serially connected.

The second and third amplifiers in each stage determine the direction of pulse counting (forward or reverse). Thus, the sequential pulses supplied to the first amplifier in the first stage may represent bipolarity signals such as are obtained from port and starboard steering in a navigation control system. The presence or absence of fluid flow in selected outputs of the second or third amplifiers determines the binary logic which represents the algebraic sum of the sequential pulses supplied to the first stage.

Additional control of the power fluid in the first amplifier is provided to obtain a presetting feature whereby the binary logic of the counter may be stored at any desired (preset) count.

An additional stage of three amplifiers, of construction identical to the counter stages, provides a read-out function. The read-out stage indicates the attainment by the counter of its maximum count by an appropriate switching of the fluid flow in such stage.

The features of my invention which I desire to protect herein are pointed out with particularity in the appended claims. The invention itself, however, both as to its organization and method of operation, together with further objects and advantages thereof, may best be understood by reference to the following description taken in connection with the accompanying drawings wherein:

FIGURE 4 is a table which illustrates the binary logic developed within the counter of FIGURES 2 and 3 for a particular sequence of input fluid pulses.

Figure 1:
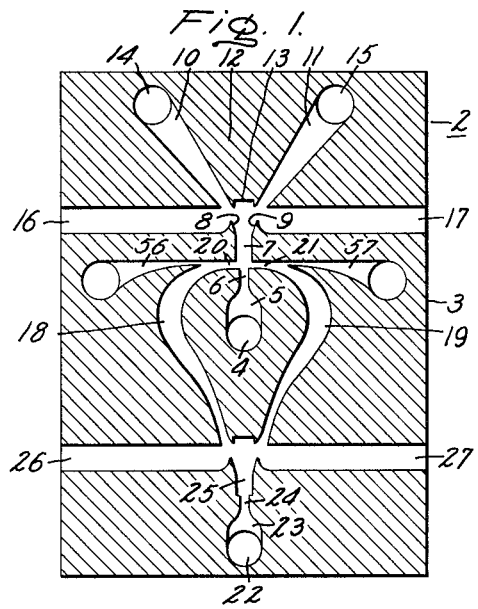
FIGURE 1 is a diagrammatic view in top plan of a digital-type fluid amplifier operable as a single stage binary counter which can only count in a single direction constructed in accordance with my invention.

Referring now to the drawings there is illustrated in FIGURE 1 a preferred embodiment of a digital or boundary layer type fluid amplifier adapted to convert successive fluid pulses into alternating output fluid flows and indicated as a whole by numeral 2. A fluid amplifier includes a flat plate 3 formed of any suitable nonporous, structurally rigid material, such as metal, glass, plastic, or the like, which is slotted in a special configuration to provide passages for fluid. The various slots in plate 3 may be formed in any suitable manner and may extend entirely through the plate or may be of lesser depth as desired. It is to be understood that the material of plate 3 must be nonreactive with the fluid material flowing through the amplifier. The fluid flow is confined within the slots by means of suitable enclosures such as cover plates (not shown) which are positioned on opposite sides of plate 3. The slots which define the fluid passages are preferably rectangular in cross section, although other cross sections, such as circular, may be employed.

Each fluid amplifier hereinafter described comprises a primary or power fluid inlet means which provides a primary or power fluid flow which is to be controlled in a manner to be described. The primary fluid inlet means, as illustrated in FIGURE 1, includes passage or conduit 4 having a first end connected to a source (not shown) of pressurized primary or power fluid. Conduit 4 extends in a direction preferably perpendicular to the plane containing the fluid flow configuration of the amplifier for ease in arranging the stages of the binary counter in a stacked fashion to provide a compact device. Alternatively, conduit 4 may be a slot within plate 3 extending outwardly to an edge of such plate. The second end of conduit 4 is in fluid communication with a fluid passage 5 terminating in a restricted slot forming a nozzle 6 adapted to generate a power fluid flow in the form of a power jet of fluid issuing therefrom. The power fluid issuing from nozzle 6 passes into interaction chamber 7 which is defined by a pair of diverging side walls 8 and 9. The fluid jet issuing from nozzle 6 normally attaches to one or the other of the side walls and remains in such state of attachment if left undisturbed. A pair of fluid flow outlet means or receivers are disposed downstream from the primary fluid inlet means and are adapted to selectively receive the fluid of the power jet, the particular receiver obtaining the fluid being determined by the attached position of the power jet. The fluid outlet means comprises two elongated diverging fluid receiving passages 10 and 11 which are separated by a barrier 12 having an indentation 13 positioned symmetrically with respect to the central axis of nozzle 6. The indentation establishes a vortex flow which operates to compress the power jet against the side wall to which it is attached, resulting in both improved jet stability and an appreciable increase in the fluid pressure recovered at receivers 10 and 11 over that obtainable without the indentation. Indentations having configurations other than the rectangular one illustrated may similarly be employed. The ends of fluid receiving passages 10 and 11 are in fluid communication with conduits 14 and 15 which convey the output fluid flow of amplifier 2 to other amplifiers as hereinafter described. Vent passages 16 and 17 are symmetrically positioned adjacent the entrance to fluid receivers 10 and 11 and extend outwardly to the edge of plate 3 to provide communication either to the atmosphere or a return path to the pressurized fluid supply as desired. Vents 16 and 17 act to relieve the fluid pressure in the receivers which results from unusual loading conditions. The vents also operate to stabilize the jet against a side wall and provide an increase in pressure recovery. A pair of secondary or control fluid flow inlet means are provided for purposes of detaching the power jet from one side wall and switching or flipping it to the opposite wall. Secondary fluid flow inlet means comprise a pair of control fluid passages 18 and 19, each terminating in a restricted slot forming nozzles 20 and 21, respectively, which is adapted to generate a control fluid flow in the form of a control jet of fluid emitted therefrom. Control nozzles 20 and 21 are positioned within the side walls of interaction chamber 7, adjacent power nozzle 6, and on opposite sides of the center line thereof. Control fluid passages 18 and 19 are in communication with a common source of pressurized fluid comprising successive fluid pulses. The fluid pulses are conveyed from a supply (not shown) to passages 18 and 19 by means of conduit 22, passage 23, nozzle 24, and interaction chamber 25. Suitable vent passages 26 and 27 may also be provided at the entrance to passages 18 and 19.

Fluid amplifier 2 operates in the following manner. Assuming that a power jet issuing from power nozzle 6 is initially attached to the left side wall 8, a clockwise flow is established in the loop including control fluid passages 18 and 19 since the power jet entrainment causes a lower fluid pressure to exist at the left control nozzle 20 than at nozzle 21. Upon application of an input fluid pulse to conduit 22, the clockwise circulation flow causes the input pulse to flow through fluid passage 18 and the power jet is thereby switched to the right, that is, to receiver 11. Upon termination of the input fluid pulse, a counterclockwise flow is generated within passages 18 and 19 by entrainment of the power jet since the fluid pressure in control nozzle 21 drops below the pressure in control nozzle 20. The next input fluid pulse will then flow through control passage 19 which will switch the power jet back to its original position. This arrangement provides an output fluid pulse at a selected receiver for each two input fluid pulses. Thus, amplifier 2 may be described as a single-stage binary counter or binary flip-flop circuit.

Fluid amplifier 2 provides the most basic binary counting function, that of summing or counting input fluid pulses to a total of two at which time the state of the binary logic has reverted to its original or zero count. The basic counting function is performed in a single direction, as for example, counting pulses of a single polarity. It is often desirable to count pulses in both a forward and reverse direction. A typical example of such application is an automatic navigation control system for steering a vessel in water. In such application, a suitable transducer (not shown) converts a signal, which commands a prescribed change of course heading in the port or starboard direction, into a series of fluid pulses; the number of pulses being, in general, directly proportional to the degree of change in course heading. The direction of the heading change is represented by fluid flow from a second or third fluid outlet means of the transducer. Thus, a command to change course heading in the starboard direction may be represented as a fluid flow from a second outlet means, and a port direction command represented as a fluid flow from a third outlet means.

A binary counter to be of practical use must comprise a plurality of binary counter stages whereby a summation of $2^n$ is obtained, $n$ being the number of stages. Thus, a five-stage binary counter provides a summation of 32 counts before reverting to zero. The term "summation," "addition," or "counting" of pulses as herein described involves the process of successively adding a single pulse to the previous sum or count, and does not refer to the simultaneous addition of a first plurality of pulses and a second plurality to obtain their sum.

Figure 2:
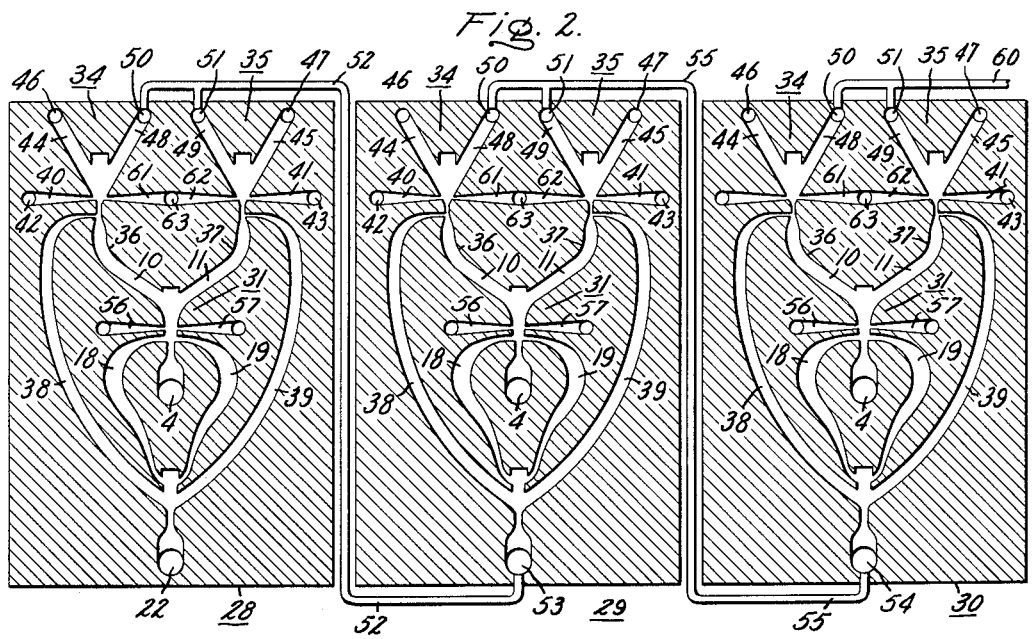
FIGURE 2 is a digrammatic view in top plan of a three-stage reversible binary counter constructed in accordance with my invention.

FIGURE 2 illustrates a three-stage binary counter circuit which is adapted to count fluid pulses in both a forward and reverse direction. The three stages are represented generally by numerals 28, 29, and 30. Each of the three stages comprises a first fluid amplifier 31, which performs a flip-flop function similar to that of amplifier 2 illustrated in FIGURE 1. In addition, each stage further comprises a second and third amplifier which may be described as an AND component to provide the bidirectional logic for permitting the binary counter to algebraically sum, that is, count the fluid pulses supplied to the binary counter.

The second and third amplifiers in each stage are represented as a whole by numerals 34 and 35, respectively. The three amplifiers of each stage are preferably formed in the same plate of material and each additional stage is disposed in parallel relationship to the first stage to form a stacked arrangement whereby a compact device is obtained. The second and third amplifiers are similar in construction to the first amplifier, the primary differences between such two groups of amplifiers being the means for supplying the power fluid and control fluids thereto. Referring in particular to the first stage 28, the first amplifier 31 is continuously supplied with a power fluid from conduit 4 during the operation of the binary counter. Second and third amplifiers 34 and 35, respectively, have power fluid passages 36 and 37 alternately supplied with power fluid since such passages are in fluid communication with receivers 10 and 11 of the first amplifier. Thus, at any one instant of time only one of the second and third amplifiers of each stage is supplied with power fluid and thereby conveys an output fluid flow to one of the receivers of such amplifier. The fluid pulses to be counted by the binary counter which are supplied to amplifier 31 by means of conduit 22 are also supplied as control fluid flows to amplifiers 34 and 35 by means of fluid passages 38 and 39, respectively. The control fluid jets which are generated by the nozzle terminating ends of passages 38 and 39 are insufficient in magnitude of fluid pressure to deflect the power jet alternately supplied from one of fluid passages 36 or 37. A second input control fluid flow is supplied to amplifiers 34 and 35 and is disposed adjacent the same side of the power jet as the first control fluid flow provided by passages 38 and 39. The second control fluid flows passing through nozzle terminating fluid passages 40 and 41 are supplied to conduits 42 and 43 from the portion of the transducer which indicates the direction of the heading change. Thus, in the aforementioned automatic navigation control system, a change in the course heading in the starboard direction may be represented by supplying control fluid to conduit 42 while a change in the port direction is represented by an input to conduit 43. It is evident that control fluid flow cannot exist concurrently through both passages 40 and 41. A power fluid jet in amplifier 34 or 35 remains attached to the side wall provided with the two control nozzles, in the absence of simultaneous control fluid flows thereto. The power jet becomes detached and switched to the other side wall of such amplifier only while the first and second control fluid flows are simultaneously supplied. Thus, amplifiers 34 and 35 may be described as AND circuits. The fluid receivers of amplifiers 34 and 35 which are adjacent the side walls containing the two control nozzles are in communication either with the atmosphere or a return path to the pressurized fluid supply as desired. Thus, receivers 44 and 45 are provided with conduits 46 and 47, respectively, which exhaust any power fluid received from the amplifier. The second receivers 48 and 49 of amplifiers 34 and 35, respectively are provided with conduits 50 and 51 which are connected to a common fluid passage 52 that transmits power fluid comprising fluid pulses to the input conduit 53 of the second stage 29. At conduit 53, this power fluid becomes a control fluid for the second stage. The transmission of fluid within passage 52 is determined by the state of the fluid logic in the first stage. Thus, there is no fluid flow in passage 52 when both of the control fluid flow inputs to amplifiers 34 or 35 are not provided; and under such conditions, the power jet exhausts from receiver 44 or 45. As a practical matter, the control fluid flow in passages 40 or 41, which is indicative of the pulse counting direction, will not be absent in the presence of the fluid pulses to be counted which are supplied to conduit 22. However, direction indicative fluid flow in passages 40 or 41 may be present in the absence of fluid pulses to be counted. In like manner, fluid flow is transmitted from selected receivers of the second and third amplifiers in the second stage 29 to the input control fluid conduit 54 of the third stage 30 by means of fluid passage 55.

Figure 3:
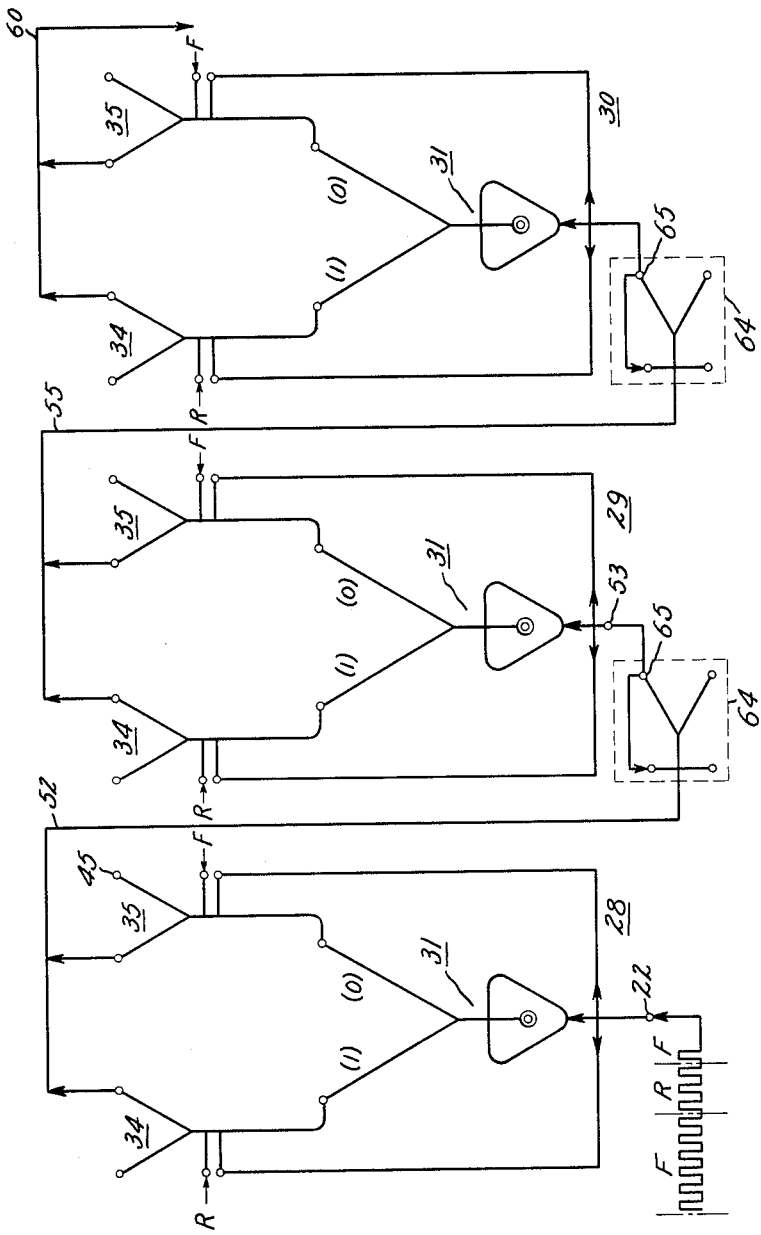
FIGURE 3 is a schematic representation of the reversible binary counter of FIGURE 2.

The operation of the reversible binary counter may best be explained by illustrating a sequence of pulse counting in both the forward and reverse directions. Referring to FIGURES 3 and 4, FIGURE 3 is a schematic representation of the three-stage reversible binary counter illustrated in FIGURE 2, and FIGURE 4 is a table illustrating the binary logic which is produced when counting a train of ten sequential fluid pulses comprising six pulses in a forward (F) direction, three pulses in a reverse (R) direction, and a tenth pulse in the forward direction. The receivers of the first amplifier in each stage are identified by the conventional binary one "1" and binary zero "0" characters, and by way of example, the receiver 11 (FIGURE 2) which transmits the power fluid to the fluid amplifier 35 responsive to the forward (F) direction of pulse counting is indicated as binary zero. In like manner, the receiver 10 which transmits the power fluid to the fluid amplifier 34 responsive to the reverse counting direction is indicated as binary one. Assume that the binary counter is initially set at zero count. In this condition, the power fluid flow exhausts from receiver 45 of amplifier 35 in the first stage and the second and third stages are in a similar state. Now assume the train of ten successive fluid pulses are supplied to the counter input (conduit 22 of the first stage 28). The counter is now instructed to count in the forward direction by supplying fluid in the F control passages of amplifier 35, and thus a simultaneous absence of fluid in the R passages. Under this condition, the power fluid can flow from a given counter stage to a successive stage only by passing through amplifier 35. The first (forward) pulse supplied to conduit 22 provides the second control input to amplifier 35 in the first stage 28. However, this first pulse switches the power fluid flow from the initial "0" state to the "1" state in amplifier 31 of the first stage. Therefore, no fluid flow can be passed to the second and subsequent stages, and the binary logic states of the three stages appear as shown in FIGURE 4 at the pulse count of 1. The second (forward) pulse supplied to conduit 22 switches first stage amplifier 31 from the "1" state to the "0" state, and first stage amplifier 35 thereby transmits the power fluid to the second stage input conduit 53 via passage 52. This transmitted fluid changes the state of second stage amplifier 31 from "0" to "1" and the binary logic states of the three stages appear as shown in FIGURE 4 at the pulse count of 2. Successive input pulses will switch the counter stages in the manner indicated in FIGURE 4 to provide the forward counting function.

When the counter is to be reversed, the fluid is removed from the F control passages and supplied instead to the R passages. Under such condition, the power fluid is transmitted to a successive stage only by passing through amplifier 34 when amplifier 31 is in the "1" state. This arrangement reverses the counting direction, that is, subtracts input pulses from the count then existing in the counter. For example, assume the counter to be operating in the forward direction and to contain a count of 6. The states of the three stages are indicated in FIGURE 4. Application of fluid to the R passages and the seventh (reverse) pulse to conduit 22 switches first stage amplifier 31 from the "0" to the "1" state. First stage amplifier 34 now transmits the power fluid to the second stage 29. Second stage amplifier 31 switches from the "1" to the "0" state and thus no fluid is transmitted to the third stage 30, thereby resulting in binary logic representing a count of 5.

An additional secondary or control fluid flow inlet means is preferably employed in the AND circuits to provide a constant bias control fluid flow which ensures the nonpassage of power fluid to receivers 48 and 49 of the second and third amplifiers in each stage in the absence of simultaneous control fluid inputs thereto. The bias control fluid flow inlet means, illustrated in FIGURE 2, comprises two fluid passages 61 and 62 supplied from a common conduit 63. Passages 61 and 62 terminate in nozzles which are disposed in the side walls opposite to the side walls containing the nozzles being supplied by the input fluid pulses and the flow indicative of the counting direction.

The binary counter may be preset to any desired count by providing a pair of control fluid passages 56, 57 terminating in oppositely disposed nozzles which are positioned in the interaction chamber of the first fluid amplifier in each stage. The desired preset count is obtained by supplying pressurized fluid to selected ones of the fluid passages 56, 57 in each stage whereby the desired pattern of fluid flow in selected receivers 10 or 11 in each stage is produced. By this means, the binary counter may be preset to any desired number. In FIGURE 1, passages 56 and 57 are shown terminating in tangential relationship to passages 18 and 19, respectively. An alternative configuration is shown in FIGURE 2 wherein the passages are in spaced-apart relation.

Read-out means for the binary counter may comprise any of several conventional forms. For a visual readout, for example, the conduits in communication with receivers 44 and 45 in each stage may be connected to small lengths of vertical tubing (not shown) constructed of a transparent material having a retaining member located at the end of the tubing removed from the receiver. The tubing contains a small movable body, such as a hollow plastic ball, which is forced against the retaining member during a period of fluid flow within receivers 44 or 45 and which settles to the bottom of the tube in the absence of fluid flow therein. Suitable transducers which convert fluid flow or pressure to an electrical signal may also be employed as read-out means.

My invention employs a read-out means which utilizes no moving parts and comprises a stage of three fluid amplifiers which is identical to a stage of the binary counter circuit. Thus, FIGURE 2 may also be described as a two-stage reversible counter 28, 29 and a read-out stage 30. In the case of a three-stage counter, the read-out stage would be connected to the output fluid passage 60 of the last stage, the output of such last stage being connected to the input of the read-out stage in a manner identical to the interstage connections. A read-out function is obtained by the switching of the output fluid flow in such read-out stage at the time when the binary counter has arrived at its maximum count. Thus, in the illustrated two-stage counter, the read-out stage 30 provides a fluid flow output in passage 60 when the algebraic sum of the input fluid pulses to conduit 22 has reached a total of four. The fluid flow in the output of the read-out stage terminates on the second algebraic count of four and then is successively initiated and terminated with subsequent counts of four. Variable counts, that is, counts which may be less than four for a two-stage counter, are read out by presetting the read-out stage to four minus the desired count. Passage 60 may be connected to a suitable transducer whereby the read-out is indicated by means such as, by way of example, meter movement or a flashing lamp for visual indications.

Conduits 38, 39 are employed to prevent erroneous registration of a count upon reversal of counting direction during a quiescent condition at the pulse inputs 22, 53, 54 to the respective counter stages 28, 29, 30, that is, during a time interval between pulses at such input. However, the possibility exists that the direction of pulse counting may be changed during a nonquiescent condition at the pulse inputs to the counter stages, that is, during a time interval that an input pulse is being supplied to a pulse input of a counter stage. Under such condition, the binary counter as hereinabove described would register an erroneous count. To avoid this error in the second and third counter stages, pulse generating circuit 64, shown schematically in FIGURE 3, are connected to fluid passages 52, 55, and 60. It should be understood that a pulse generating circuit 64 may also be connected at the input to conduit 22 to avoid this error in the first counter stage. Pulse generator 64 comprises a fluid amplifier having a feedback fluid passage connected from a selected receiver 65 to a control nozzle positioned on the side wall of the interaction chamber adjacent such receiver. A short duration fluid pulse appears at receiver 65 in response to the initiation of power fluid flow thereto. The time duration of the generated pulse is determined by the time for the power fluid to feed back from receiver 65 to the control nozzle. The use of pulse generators 64 results in a fluid flow to input conduits 53 and 54 comprising short duration pulses in place of the relatively long periods of fluid flow without such pulse generators.

From the foregoing description, it can be appreciated that my invention makes available a new and improved fluid-operated reversible binary counter which employs no moving parts. The reversible feature permits operation of the counter as a digital integrator or averaging device. The preferred embodiment of my invention comprises three digital-type fluid amplifiers in each stage of counting logic. The stages are interconnected in serial arrangement to provide the desired capacity of counts. The binary counter may be preset to any selected count by the use of an additional pair of control fluid nozzles in the first amplifier of each stage and the maximum count of the binary counter may be determined by means of an additional stage of amplifiers which provide a read-out function.

Having described a new fluid-operated reversible binary counter, it is believed obvious that other modifications and variations of my invention are possible in the light of the above teachings. For example, the second and third amplifiers in each stage may comprise OR-NOR components instead of AND components. The OR component is a fluid amplifier including a single-control input as distinguished from the two-control input AND component. The control input is supplied with the fluid indicative of the pulse counting direction. However, two pulse generators 64 must be provided in each stage when employing OR components. The pulse generators are connected between the receivers of the first amplifier and the power fluid inputs to the second and third amplifiers. No additional pulse generators are required in the OR embodiment to prevent counting error in the event the pulse counting direction is changed during the interval of an input pulse. As another example of a modification of my invention, each fluid amplifier may be fabricated from a separate plate of material and the amplifiers of each stage then interconnected by suitable conduits to form a stage. In the alternative, in a counter having a reasonably small number of stages, all of the amplifiers may be fabricated from a single piece of material. It is, therefore, to be understood that changes may be made in the particular embodiments of my invention described which are within the full intended scope of the invention as defined by the following claims.

What I claim as new and desire to secure by Letters Patent of the United States is:

1. A fluid-operated reversible binary counter comprising first means for converting succesive fluid pulses into alternating fluid flows which represent particular states of binary logic, second means responsive to a first of said alternate flows and to a first pulse counting direction flow for effecting counting of the pulses in a forward direction, and third means responsive to a second of said alternate flows and to a second pulse counting direction flow for effecting counting of the pulses in a reverse direction.

2. A fluid-operated, reversible binary counter comprising first means for converting successive fluid pulses to be counted into alternating fluid flows, second means responsive to a first of said alternate flows for generating a first selected fluid flow when said fluid pulses and a second fluid flow indicative of a forward pulse counting direction are simultaneously provided thereto, and third means responsive to a second of said alternate flows for generating a second selected fluid flow when said fluid pulses and a third fluid flow indicative of a reverse pulse counting direction are both provided thereto, said first and second selected flows being either both absent or alternately present during any interval of time and thereby determining a state of binary logic for algebraically counting said pulses.

3. A fluid-operated, reversible binary counter comprising first fluid-operated means responsive to a fluid flow comprising sequential fluid pulses, output of said first means comprising first alternating fluid flows which alternate with each successive input pulse, second fluid-operated means responsive to a first of said first alternating output flows, said second means being further responsive to said sequential fluid pulses and to a first intermittent fluid flow which represents a forward pulse counting direction, said second means providing a selected one of second alternating output fluid flows upon simultaneous application of the first of said first alternating output flows, said sequential fluid pulses, and said first intermittent flow thereto, and third fluid-operated means responsive to a second of said first alternating output flows, said third means being further responsive to said sequential fluid pulses and to a second intermittent fluid flow which represents a reverse pulse counting direction, said third means providing a selected one of third alternating output fluid flows upon simultaneous application of the second of said first alternating output flows, said sequential fluid pulses, and said second intermittent flow thereto, said second and third alternating output flows representing states of binary logic for algebraically counting said sequential pulses.

4. A single-stage, fluid-operated, binary counter adapted to count pulses in both a forward and reverse direction comprising a first fluid amplifier comprising primary fluid flow inlet means for providing a first primary fluid flow to be controlled, a first pair of fluid flow outlet means downstream from said inlet means for receiving said first primary flow, and a first pair of secondary fluid flow inlet means for alternately providing a pulsed control fluid flow to switch said first primary flow alternately from one said outlet means to the other, said control flow representing pulses to be counted, a second fluid amplifier comprising a second primary fluid flow inlet means in fluid communication with a first of said first pair of outlet means for providing a second primary fluid flow to be controlled, a second pair of fluid flow outlet means downstream from said second inlet means for receiving said second primary flow, and a second pair of secondary fluid flow inlet means for providing a second pair of control fluid flows to switch said second primary flow to a selected one of said second pair of outlet means, a first of said second pair of control flows being a pulsed flow representing the pulses to be counted, a second of said second pair of control flows being an intermittent flow signalling a counting of said pulses in a forward direction, and a third fluid amplifier comprising a third primary fluid inlet means in fluid communication with a second of said first pair of outlet means for providing a third primary fluid flow to be controlled, a third pair of fluid flow outlet means downstream from said third inlet means for receiving said third primary flow, and a third pair of secondary fluid flow inlet means for providing a third pair of control fluid flows to switch said third primary flow to a selected one of said third pair of outlet means, a first of said third pair of control flows being a pulsed flow representing the pulses to be counted, a second of said third pair of control flows being an intermittent flow signalling a counting of said pulses in a reverse direction.

5. A single-stage, fluid-operated, binary counter adapted to count pulses in both a forward and reverse direction comprising a first digital-type fluid amplifier comprising primary fluid flow inlet means continuously supplied with a first power fluid to be controlled, a first pair of fluid flow outlet means downstream from said inlet means, each of said first pair adapted to alternately receive said power fluid, and a first pair of secondary fluid flow inlet means disposed adjacent opposite sides of said primary inlet means, said inlet means supplied from a common source of control fluid comprising sequential fluid pulses which alternately switch said power fluid between said outlet means, said pulses representing pulses to be counted, a second digital-type fluid amplifier comprising a second primary fluid flow inlet means in fluid communication with a first of said first pair of outlet means for alternately providing a second power fluid to be controlled, a second pair of fluid flow outlet means downstream from said second inlet means, each of said second pair adapted to alternately receive said second power fluid, and a second pair of secondary fluid flow inlet means disposed adjacent a first side of said second primary inlet means, a first of said second pair of secondary inlet means supplied from said common source of sequential fluid pulses, a second of said second pair of secondary inlet means supplied from a source of first intermittent fluid which signals a counting of said pulses in a forward direction, said second power fluid being switched to a selected one of said second pair of outlet means only when said sequential fluid pulses and said first intermittent fluid are simultaneously supplied to said second amplifier, and a third digital-type fluid amplifier comprising a third primary fluid flow inlet means in fluid communication with a second of said first pair of outlet means for alternately providing a third power fluid to be controlled, a third pair of fluid flow outlet means downstream from said third inlet means, each of said third pair adapted to alternately receive said third power fluid, and a third pair of secondary fluid flow inlet means disposed adjacent a second side of said third primary inlet means, a first of said third pair of secondary inlet means supplied from said common source of sequential fluid pulses, a second of said third pair of secondary inlet means supplied from a source of second intermittent fluid which signals a counting of said pulses in a reverse direction, said third power fluid being switched to a selected one of said third pair of outlet means only when said sequential fluid pulses and said second intermittent fluid are simultaneously supplied to said third amplifier.

6. A fluid-operated, reversible binary counter comprising a plurality of serially-connected stages of binary logic, each stage comprising first means for converting successive fluid pulses into alternating output fluid flows which represent particular states of binary logic, second means responsive to a first of said alternate flows for effecting counting of the pulses in a forward direction, and third means responsive to a second of said alternate flows for effecting counting of the pulses in a reverse direction, input to said first means of the first stage comprising sequential fluid pulses to be counted, input to said first means of succeeding stages comprising output fluid flows provided by said second and third means of preceding stages whereby said plurality of stages are serially connected.

7. The binary counter as set forth in claim 6 further comprising fourth means connected between outputs of said second and third means of one stage and input to said first means of the next succeeding stage for preventing erroneous counting of the fluid pulses in the event the direction of pulse counting is changed during the interval in which one of said successive pulses is supplied to said first means.

8. A fluid-operated, reversible binary counter comprising a plurality of stages of binary logic, each stage comprising first means responsive to a pulsed input fluid flow for generating alternating output fluid flows, second means responsive to a first of said alternate output flows for generating a first selected output fluid flow when said pulsed input flow and a second input fluid flow indicative of a forward pulse counting direction are simultaneously provided, and third means reponsive to a second of said alternate output flows for generating a second selected output fluid flow when said pulsed input flow and a third input fluid flow indicative of a reverse pulse counting direction are simultaneously provided, said pulsed input flow provided to the first stage comprising sequential pulses to be counted, said pulsed input flow provided to each succeeding stage comprising said selected output flow of said second and third means in the preceding stage whereby said plurality of stages are serially connected.

9. A fluid-operated, reversible binary counter comprising a plurality of serially-connected stages of binary logic, each stage comprising a first fluid amplifier comprising primary fluid flow inlet means for continuously providing a first power fluid flow to be controlled, a first pair of fluid flow outlet means downstream from said inlet means, each outlet means adapted to alternately receive said first power flow, and a first pair of secondary fluid flow inlet means disposed adjacent opposite sides of said primary inlet means and supplied from a common source of control fluid for alternately providing pulsed control fluid flow to switch said first power flow between said outlet means, a second fluid amplifier comprising a second primary fluid flow inlet means in fluid communication with a first of said first pair of outlet means for alternately providing a second power fluid flow to be controlled, a second pair of fluid flow outlet means downstream from said second inlet means for receiving said second power flow, and a second pair of secondary fluid flow inlet means disposed adjacent a first side of said second primary inlet means for providing a second pair of control fluid flows to switch said second power flow between said second pair of outlet means, said second power flow being switched to a selected one of said second pair of outlet means when said second pair of secondary inlet means are simultaneously supplied with control fluid flows, a first of said second pair of secondary inlet means supplied from said common source of control fluid, a second of said second pair of secondary inlet means supplied with an intermittent control fluid flow indicative of a forward pulse counting direction, and a third fluid amplifier comprising a third primary fluid flow inlet means in fluid communication with a second of said first pair of outlet means for alternately providing a third power fluid flow to be controlled, a third pair of fluid flow outlet means downstream from said third inlet means for receiving said third power flow, and a third pair of secondary fluid flow inlet means disposed adjacent a second side of said third primary inlet means for providing a third pair of control fluid flows to switch said third power flow between said third pair of inlet means, said third power flow being switched to a selected one of said third pair of outlet means when said third pair of secondary inlet means are simultaneously supplied with control fluid flows, a first of said third pair of secondary inlet means supplied from said common source of control fluid, a second of said third pair of secondary inlet means supplied with an intermittent control fluid flow indicative of a reverse pulse counting direction, said common source of control fluid being supplied to the first stage comprising sequential fluid pulses to be counted, said common source of control fluid being supplied to each further stage comprising fluid flow transmitted from said selected one of said second or third pair of outlet means in the respective preceding stage.

10. A fluid-operated, reversible binary counter comprising a plurality of serially-connected stages of binary logic, each stage comprising first means for converting successive fluid pulses into alternating output fluid flows which represent particular states of binary logic, said first means provided with control means for obtaining selected said output flows whereby said binary counter is preset to a desired count, second means responsive to a first of said alternate flows for providing a counting of the pulses in a forward direction, and third means responsive to a second of said alternate flows for providing a counting of the pulses in a reverse direction, input to said first means of said first stage comprising sequential fluid pulses to be counted, input to said first means of succeeding stages comprising output fluid flows provided by said second and third means of preceding stages whereby said plurality of stages are serially connected.

11. A fluid-operated, reversible binary counter comprising $(n+1)$ stages of binary logic, each stage comprising
first means for converting successive fluid pulses into alternating output fluid flows which represent particular states of binary logic,
second means responsive to a first of said alternate flows for providing a counting of the pulses in a forward direction, and
third means responsive to a second of said alternate flows for providing a counting of the pulses in a reverse direction, input to said first means of said first stage comprising sequential fluid pulses to be counted, input to said first means of succeeding stages comprising output fluid flows provided by said second and third means of preceding stages whereby said plurality of stages are serially connected, the first $(n)$ of said $(n+1)$ stages comprising the binary counting logic stages of said counter, the $(n+1)$ stage being of construction identical to the $(n)$ stages and comprising a read-out stage which indicates the attainment of the maximum count by said $(n)$ stages.

References Cited by the Examiner

UNITED STATES PATENTS

| 3,001,698 | 9/61 | Warren | 235—201 |
| 3,093,306 | 6/63 | Warren | 235—201 |
| 3,114,390 | 12/63 | Glattli | 235—201 X |
| 3,128,039 | 4/64 | Norwood | 235—201 |

OTHER REFERENCES

A. E. Mitchell: "Fluid Binary Counter," IBM Tech. Disclosure Bulletin, vol. 6, No. 2, July 1963. 235–201.

Warren, R. W.: "Pulse Duration Modulation," Fluid Amplification Symposium, Diamond Ordnance Fuze Laboratories, 1962, pages 41–45, Received in Scientific Library, April 11, 1963.

LEO SMILOW, *Primary Examiner.*